United States Patent
Fukunaga et al.

(10) Patent No.: US 6,643,326 B1
(45) Date of Patent: Nov. 4, 2003

(54) PICTURE DECODING APPARATUS MODIFYING RECEIVED TEMPORAL REFERENCES

(75) Inventors: Shigeru Fukunaga, Toyko (JP); Toshihisa Nakai, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/418,799

(22) Filed: Oct. 15, 1999

(30) Foreign Application Priority Data

Nov. 2, 1998 (JP) ............................... 10-312064

(51) Int. Cl.$^7$ .................................................. H04N 7/18
(52) U.S. Cl. ............................ 375/240.12; 375/240.15; 375/240.26
(58) Field of Search .................. 375/240.12–240.17, 375/240.25–240.29

(56) References Cited

U.S. PATENT DOCUMENTS

| | | | | |
|---|---|---|---|---|
| 5,543,930 A | * | 8/1996 | Takano | 386/46 |
| 5,922,048 A | * | 7/1999 | Emura | 725/88 |
| 6,157,771 A | * | 12/2000 | Brewer et al. | 386/69 |

OTHER PUBLICATIONS

Technical Paper of the Telecommunication Standardization Sector of the ITU, ITU–T Recommendation H.261 adopted on Mar., 1993 entitled "Video Codec for Audiovisual Services at px64 kbits".

Technical Paper of the Telecommunication Standization Sector of the ITU, ITU–T Recommendation H.263 as of Dec., 1995 entitled "Video Coding for Low Bitrate Communication".

* cited by examiner

*Primary Examiner*—Andy Rao
(74) *Attorney, Agent, or Firm*—Rabin & Berdo, P.C.

(57) ABSTRACT

A picture decoding apparatus decodes a series of coded frames, each including a temporal reference. Past temporal references are used to estimate the temporal reference of the-current frame. If the temporal reference differs greatly from the estimated value, it is modified according to the estimated value. A coded frame may be divided into segments, each segment having its own temporal reference. In this case, the temporal references received in one coded frame are stored and compared, and a single temporal reference is selected for the coded frame. As a result, temporal-reference errors do not seriously disrupt the timing of the decoded picture.

44 Claims, 14 Drawing Sheets

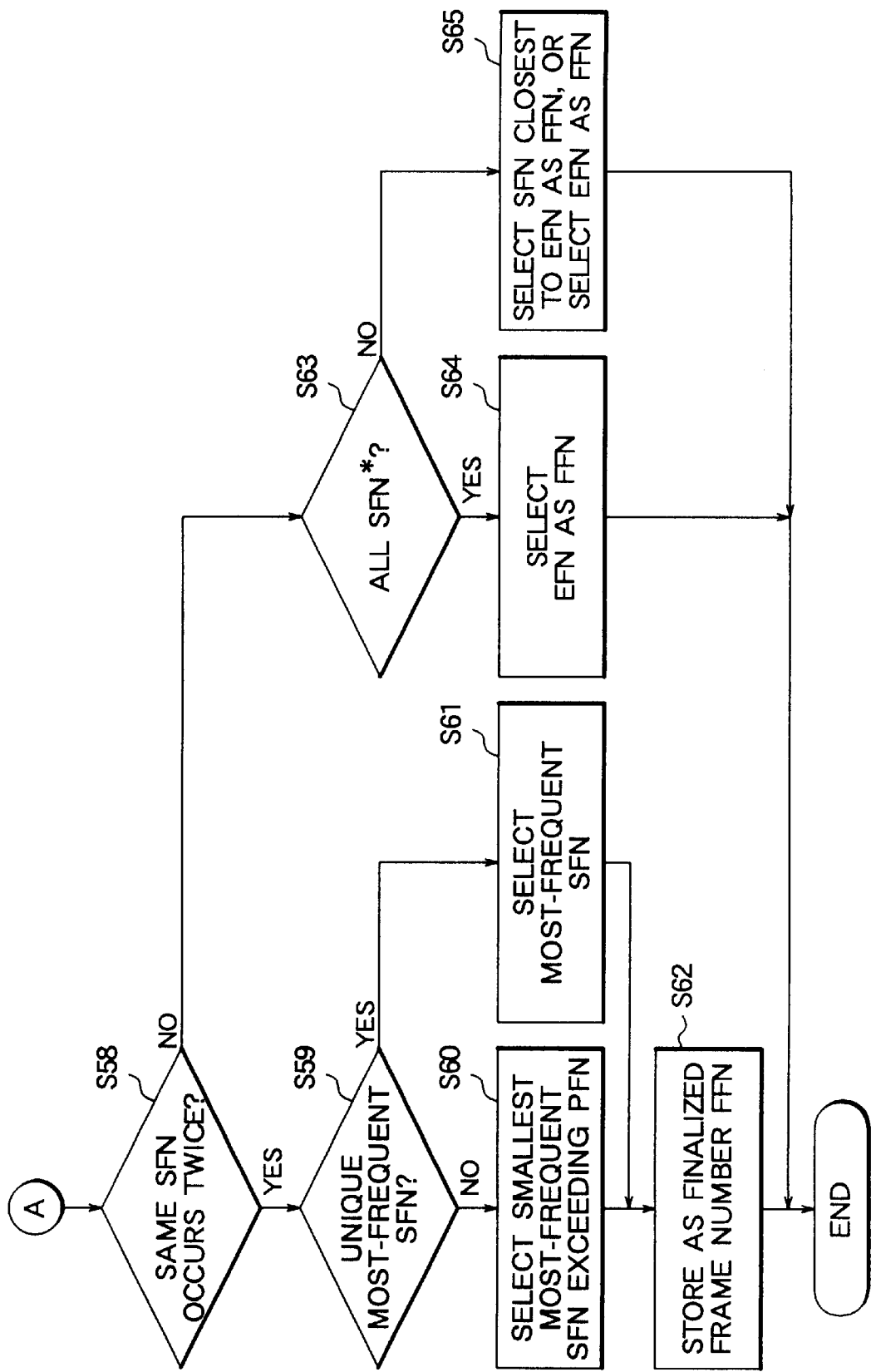

PICTURE DECODING APPARATUS MODIFYING RECEIVED TEMPORAL REFERENCES

BACKGROUND OF THE INVENTION

The present invention relates to an apparatus for decoding pictures received with temporal references.

The appearance of videophones, videoconferencing systems, video-on-demand systems, and other systems that transmit moving pictures has led to the international standardization of methods of coding such pictures. The standards set forth in recommendations H.261 and H.263 of the Telecommunication Standardization Sector of the m International Telecommunication Union (ITU-T) are well known, as are the MPEG-1, MPEG-2, and MPEG-4 standards of the Moving Picture Experts Group, which have been adopted by the International Standards Organization (ISO).

Even when moving pictures are generated at standard frame rates, such as the rate of substantially thirty frames per second designated by the National Television System Committee (NTSC), they may be transmitted at slower frame rates. A slow frame rate may be necessary because of limited transmission bandwidth, or because coding the pictures takes time. The frame rate may also vary due to the use of different coding modes, or the occurrence of different amounts of motion in the picture. A common practice is therefore to include a temporal reference in each coded frame.

In the H.263 standard, for example, the temporal reference is an eight-bit binary number, representing the least significant eight bits of the absolute frame number. The value of the temporal reference ranges from zero to two hundred fifty-five (0–255). Under certain conditions, a ten-bit temporal reference may be used, but eight bits will be assumed in the description below.

If the transmitted frame rate is ten frames per second, or one-third the NTSC frame rate, for example, then the temporal reference normally increases in increments of three (0, 3, 6, 9, . . . ), wrapping around from two hundred fifty-five to zero ( . . . , 252, 255, 2, 5, . . . ). The temporal reference tells the picture decoding apparatus that each received frame should be displayed for three NTSC frame intervals instead of just one. If the frame rate varies, the variations will be accurately reflected in the temporal-reference values, enabling the decoding apparatus to display each frame at the correct time and for the correct duration.

A problem is that the temporal references may be corrupted by transmission errors. In the H.263 standard, for example, the temporal reference (TR) occupies a fixed eight-bit field in the coded information, and is always read as a value from zero to two hundred fifty-five, regardless of whether the value is correct or not. If the value is incorrect, the timing with which the decoded frame is displayed will be incorrect. For example, a one-bit error in the least significant bit can change '00001000' (TR=8) to '00001001' (TR=9), causing the associated frame to be displayed one-thirtieth of a second late. More seriously, a one-bit error in the most significant bit can change '00001000' (TR=8) to '10001000' (TR=136), causing the associated frame to appear more than four seconds late.

When the temporal reference wraps around from two hundred fifty-five to zero, the decoding apparatus compensates by adding two hundred fifty-six. For example, if '11111111' (TR=255) is followed by '00000101' (TR=5), the later value is treated as if it were two hundred sixty-one (261=5+256). This wrapping-around can greatly magnify the effect of an error. For example, if the preceding temporal reference was '00001100' (TR=12) and a one-bit transmission error changes the current temporal reference from '00001111' (TR=15) to '00001011' (TR=11), then by the above rule, the current value (TR=11) is interpreted as two hundred sixty-seven (267=11+256), resulting in a delay of over eight seconds.

This type of false wrap-around propagates into succeeding frames. If the next temporal reference is '00010010'. (TR=18), it may be interpreted as two hundred seventy-four (274=18+256), even if received correctly. An error of this type can propagate forever without being discovered.

Partly to cope with temporal-reference errors, the H.263 and MPEG-4 standards divide a frame into a plurality of segments, also referred to as slices or groups of blocks (GOBs), and provide a redundant temporal-reference mode in which the temporal-reference value is included in the coding of each segment, in the segment header. An advantage of this system is that if any of the segments of a frame can be correctly decoded, these segments can be placed in their correct temporal positions. Segments that actually belong to different frames will not be placed in the same frame by mistake, for example.

A disadvantage of the redundant temporal-reference mode, however, is that an error in a temporal-reference value can cause a single frame to be interpreted as two or more frames, with a false wrap-around to zero and attendant long delay. An example will be shown in the detailed description of the invention.

The problems associated with incorrect temporal references are not limited to picture transmission systems; they also occur in decoding apparatus that reads coded moving-picture data from a storage device.

SUMMARY OF THE INVENTION

An object of the present invention is to avoid large timing errors caused by incorrect temporal-reference values.

Another object of the invention is to avoid the break-up of frames due to incorrect temporal-reference values in segments of the frames.

According to a first aspect of the invention, a picture decoding apparatus decodes a series of coded frames, each coded frame including a temporal reference. The apparatus has a temporal-reference memory unit storing a plurality of past temporal references. A temporal-reference estimation unit calculates an estimated temporal reference from the past temporal references. A temporal-reference modification unit compares the estimated temporal reference with the current temporal reference, and modifies the current temporal reference, if necessary, according to the difference between the current temporal reference and the estimated temporal reference.

According to a second aspect of the invention, each coded frame includes a plurality of coded segments, and each coded segment has its own temporal reference. The picture decoding apparatus has a temporal-reference memory unit storing the temporal references received in the coded segments in one coded frame. A temporal-reference finalizing unit compares the stored temporal references and selects a final temporal reference for the coded frame.

The first and second aspects of the invention may be combined.

BRIEF DESCRIPTION OF THE DRAWINGS

In the attached drawings:

FIGS. 13A and 13B are a flowchart illustrating the operation of the fifth embodiment.

DETAILED DESCRIPTION OF THE INVENTION

Figure 1:
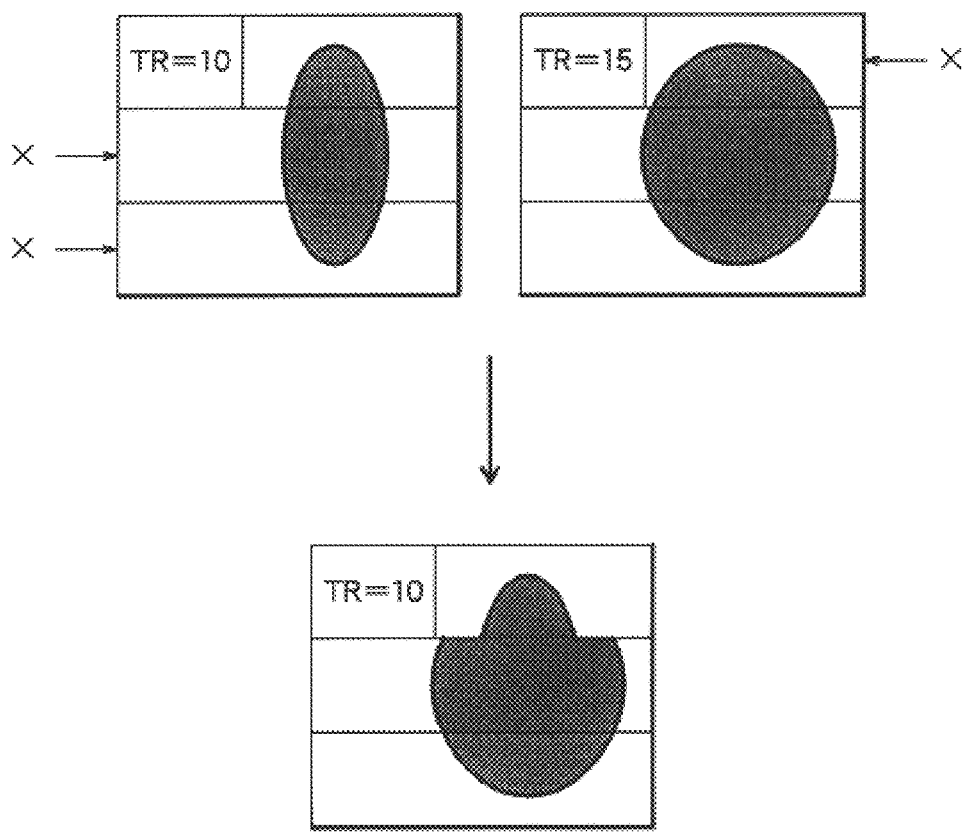
FIG. 1 shows an example of frame collapse due to data loss.

Embodiments of the invention will be described with reference to the attached drawings, in which like parts are indicated by like reference characters. First, however, a few of the problems that can occur with temporal-reference values will be illustrated.

FIG. 1 shows an example of two consecutive frames, each divided into three segments, with a temporal reference (TR) given only in the header of the first segment. The second two segments of the first frame (TR=10) and the first segment of the second frame (TR=15) are lost in transmission, as indicated by the letter X. As a result, the two frames collapse into a single distorted frame (TR=10).

Figure 2:
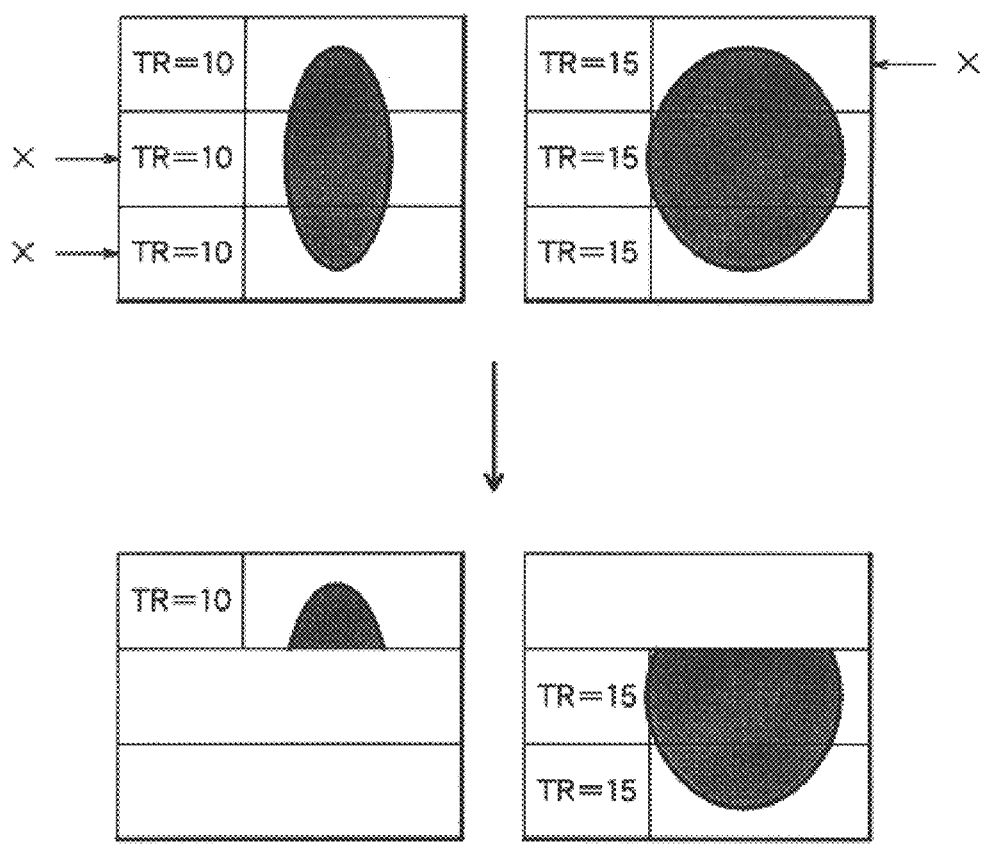
FIG. 2 shows an example of data loss not leading to frame collapse.

FIG. 2 shows the same example when a temporal reference is included in each segment. The two frames are correctly decoded as separate frames with missing parts.

Figure 3:
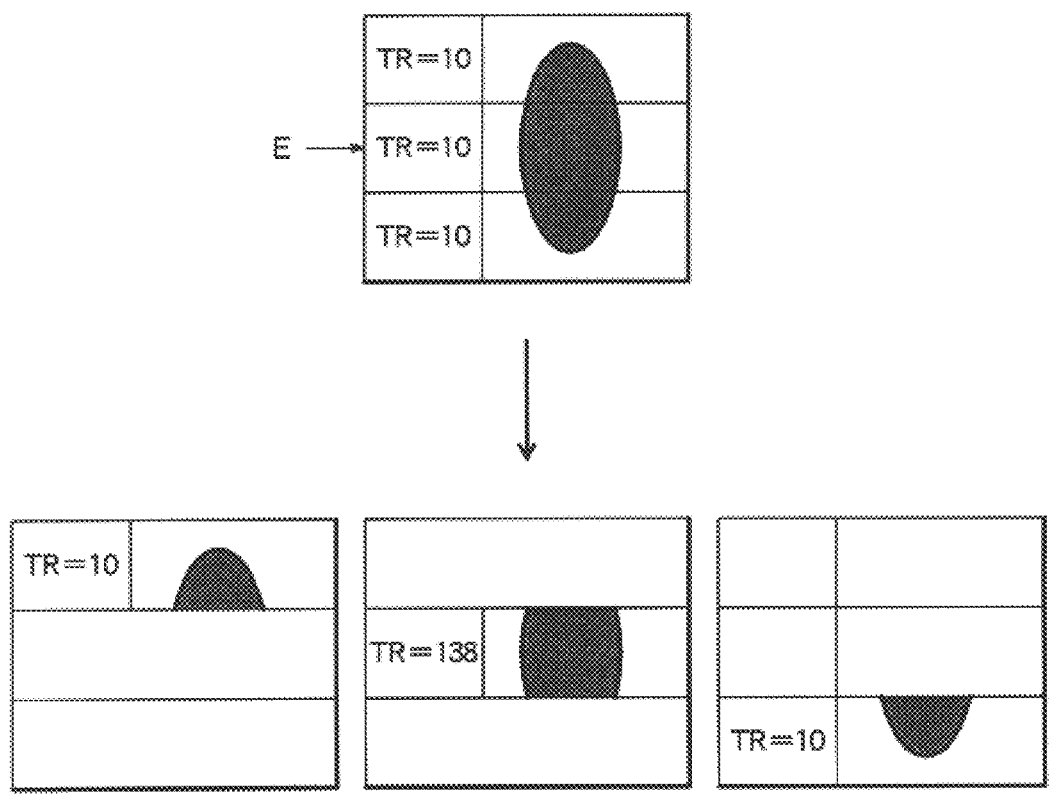
FIG. 3 shows an example of frame breakup caused by an incorrect temporal reference.

FIG. 3 shows an example of a single frame with an error E in the temporal-reference value of the second segment (changing the temporal reference from 10 to 138). This frame is incorrectly decoded as three separate frames, each having two missing segments.

The type of transmission error illustrated in FIGS. 1 and 2, in which a one-frame portion of two consecutive frames is lost, is fairly unusual. When this type of error does occur, it is difficult to conceal completely. In FIG. 2, for example, the missing segments must be supplied with data taken from surrounding segments or from a previous frame; some picture degradation is generally unavoidable. Fortunately, the degradation is temporary. No timing errors propagate into subsequent frames.

The type of error illustrated in FIG. 3, caused by the alteration of one temporal reference bit, occurs more frequently, propagates into subsequent frames, and has a serious disruptive effect. Correcting this type of error is, accordingly, more important than correcting the type of error shown in FIG. 1.

1st Embodiment

The first embodiment stores past temporal-reference values, uses the stored temporal-reference values to estimate the temporal-reference value of the next frame, and modifies the received temporal-reference value if it departs greatly from the estimated value.

Figure 4:
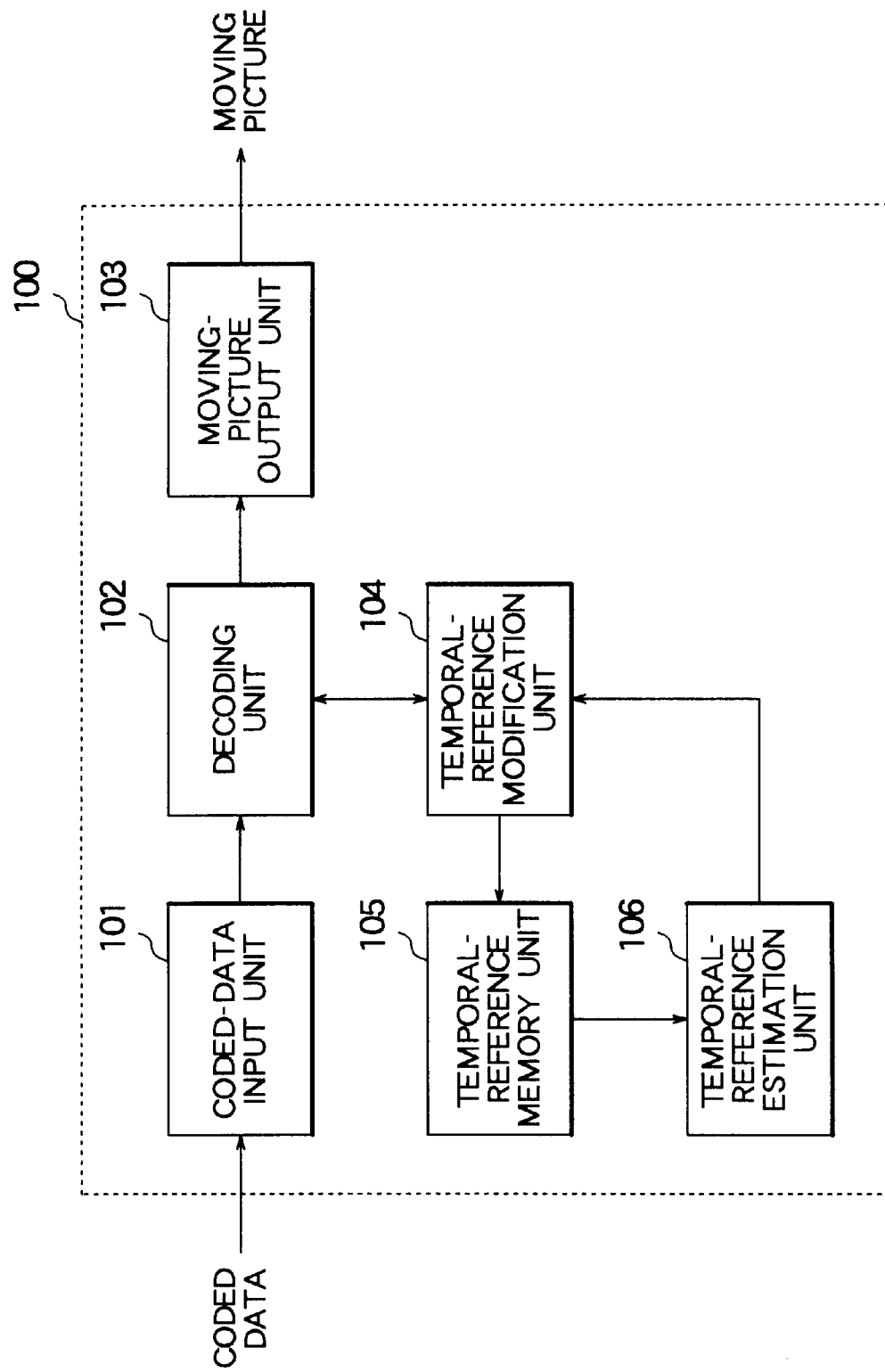
FIG. 4 is a block diagram of a picture decoding apparatus illustrating a first embodiment of the invention.

Referring to FIG. 4, the first embodiment is a moving-picture decoding apparatus 100 comprising a coded-data input unit 101, a decoding unit 102, a moving-picture output unit 103, a temporal-reference modification unit 104, a temporal-reference memory unit 105, and a temporal-reference estimation unit 106.

The coded-data input unit 101 receives coded moving-picture data from a communication network or channel, or reads coded moving-picture data from a storage device, and supplies the coded data to the decoding unit 102. One temporal reference per frame is included in the data.

The decoding unit 102 decodes the data by inter-frame or intra-frame decoding, as specified in the coded data. In inter-frame coding, a frame is decoded with reference to a preceding frame. In intra-frame decoding, a frame is decoded without such reference. In either case, the decoding unit 102 supplies the temporal reference accompanying each coded frame to the temporal-reference modification unit 104, and receives a temporal reference from the temporal-reference modification unit 104. The decoding unit 102 supplies the temporal reference received from the temporal-reference modification unit 104 to the moving-picture output unit 103, together with the decoded picture data.

The moving-picture output unit 103 outputs each decoded frame to a monitor display device (not visible) at timings determined by the temporal reference received from the decoding unit 102.

The temporal-reference modification unit 104 modifies the temporal reference received from the decoding unit 102 according to an estimated temporal reference received from the temporal-reference estimation unit 106. Specifically, if the temporal-reference value received from the decoding unit 102 is greater than the sum of the estimated value and a predetermined threshold parameter d, the temporal-reference modification unit 104 returns the estimated value to the decoding unit 102. Otherwise, the value received from the decoding unit 102 is returned without modification.

The temporal-reference memory unit 105 stores the temporal references received from the temporal-reference modification unit 104 for the past several frames. Each temporal reference is stored together with a flag bit indicating whether or not the value was modified by the temporal-reference modification unit 104. Alternatively, only temporal references that have not been modified by the temporal-reference modification unit 104 are stored in the temporal-reference memory unit 105.

The temporal-reference estimation unit 106 calculates the average interval between the temporal-reference values stored in the temporal-reference memory unit 105, adds the average interval to the temporal-reference value of the preceding frame to estimate the temporal reference of the current frame, and supplies the estimated value to the temporal-reference modification unit 104.

The above elements 101, 102, 103, 104, 105, 106 comprise semiconductor memory and logic circuits, detailed descriptions of which will be omitted.

Next, the operation of the first embodiment will be described. Only operations on the temporal-reference value will be described.

Figure 5:
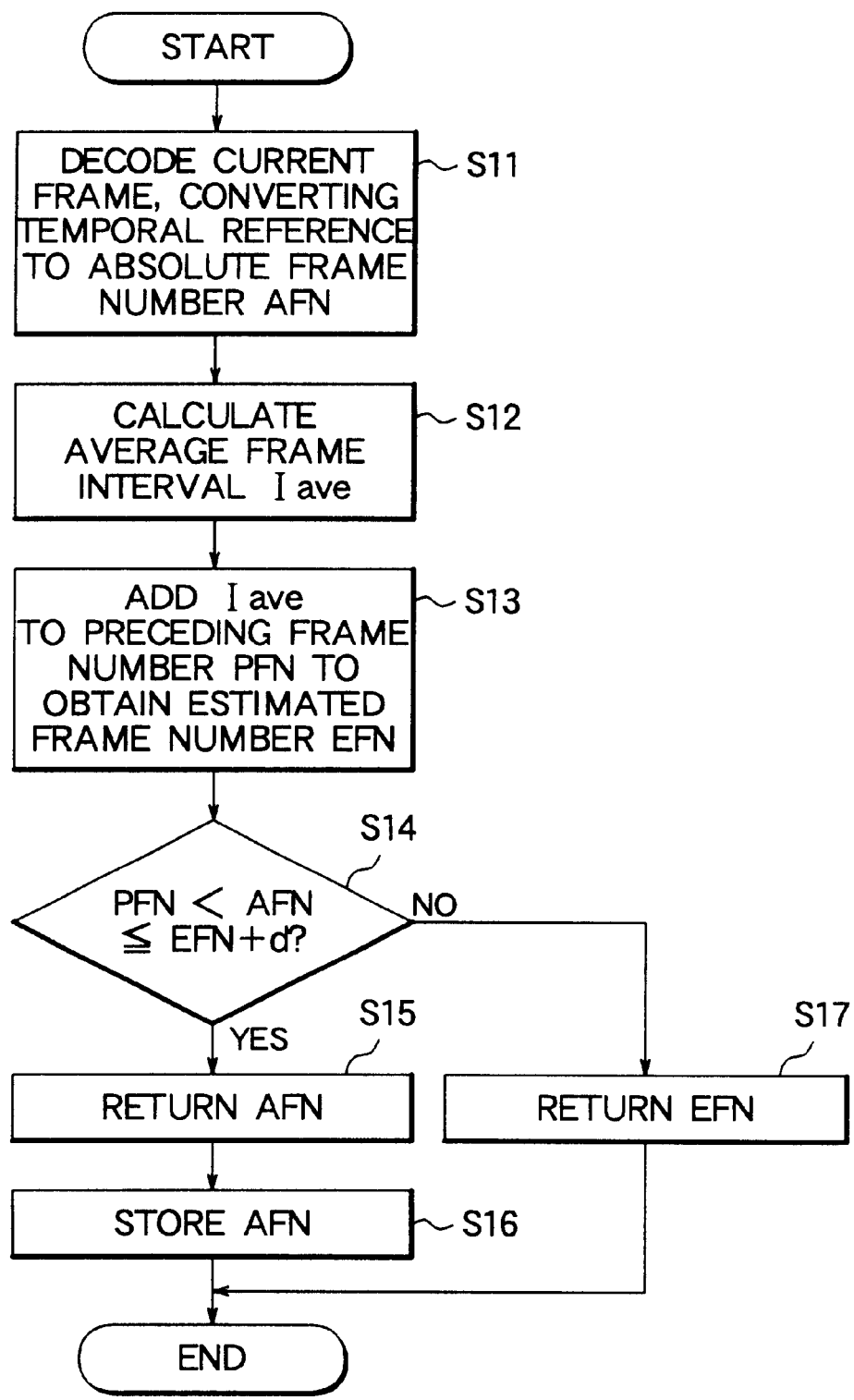
FIG. 5 is a flowchart illustrating the operation of the first embodiment.

Referring to FIG. 5, in decoding, the coded picture data, the decoding unit 102 adds high-order bits to the received temporal reference. If the current temporal reference has an unsigned eight-bit value exceeding the least significant eight bits of the preceding temporal reference received from the temporal-reference modification unit 104, the decoding unit 102 gives the current temporal reference the same high-order bits as the preceding temporal reference. Otherwise, the decoding unit 102 increments the high-order bits by one, thereby adding two hundred fifty-six to the temporal-reference value. These operations convert the temporal-reference value to an absolute frame number AFN (step S11).

Absolute frame numbers are used as temporal-reference values in all of the succeeding operations. The temporal references stored in the temporal-reference memory unit 105 are absolute frame numbers.

Next, the temporal-reference estimation unit 106 calculates the average interval (Iave) between frames (step S12). Since the temporal-reference values stored in the temporal-reference memory unit 105 have been converted to absolute frame numbers, the average interval can normally be calculated as the difference between the newest and oldest values stored in the temporal-reference memory unit 105, divided by the number of intervening intervals. Estimated values, if stored, are preferably not used as the newest and oldest values. The result is rounded off to an integer, preferably by rounding fractions greater than one-half up and fractions less than one-half down, although unconditional round-up or round-down can be used instead, for simplicity. The temporal-reference estimation unit 106 adds the calculated average interval (Iave) to the preceding frame number PFN to obtain an estimate EFN of the current frame number (step S13).

The temporal-reference modification unit 104 compares the estimated frame number EFN with the received frame number AFN (step S14), also confirming that the received frame number AFN is greater than the preceding frame number PFN. If the received frame number AFN is greater than the preceding frame number PFN, and is not greater than the sum of the estimated frame number EFN and the threshold parameter d, the received frame number AFN is returned to the decoding unit 102 as a correct frame number (step S15), and is stored in the temporal-reference memory unit 105 (step S16). If the received frame number AFN is equal to or less than the preceding frame number PFN, or exceeds the sum of the estimated frame number EFN and the threshold parameter d, the estimated frame number EFN is returned to the decoding unit 102 (step S17). Because of the conversion in step S11, the first condition (PFN<AFN) is always satisfied, so only the second condition (AFN≦EFN+d) actually has to be tested in step S14.

Following step S17, the estimated frame number EFN may also be stored in the temporal-reference memory unit 105, if it is flagged as having been modified. If the estimated frame number EFN is not stored in the temporal-reference memory unit 105 following step S17, then it is retained in the temporal-reference modification unit 104 for use as the preceding frame number PFN in the next frame.

As an example of the operations in FIG. 5, if the threshold parameter d is equal to two (d=2), the average interval is calculated to be three (Iave=3), and the preceding temporal-reference value was '00000101' (TR=5), and if an error alters the current temporal-reference value from '00001000' (TR=8) to '10001000' (TR=136), the temporal-reference modification unit 104 changes this incorrect value to the correct value (TR=8).

If an error alters the current temporal-reference value from '00001000' (TR=8) to '00000000' (TR=0), the temporal-reference modification unit 104 again changes this incorrect value to the correct value (TR=8), instead of regarding it as two hundred fifty-six (TR=256) and creating a serious timing error, as can happen in the prior art.

If an error alters the current temporal-reference value from '00001000' (TR=8) to '00001010' (TR=10), the temporal-reference modification unit 104 accepts this erroneous value (TR=10) as correct. The resulting timing error is small enough that the effect on the displayed picture is scarcely noticeable.

If the current temporal-reference value is '00000111' (TR=7) and an error alters this to '00001111' (TR=15), the temporal-reference modification unit 104 changes the value to '00001000' (TR=8). The modified value is not correct, but the timing error is reduced from a noticeable size to an inconspicuous size.

If the threshold parameter d is too large, undesirably large errors will be accepted as correct, but if d is too small, then true variations in the frame interval may be treated as errors. To avoid both of these eventualities, the value of d should be approximately equal to the average frame interval, or at most to about two or three times the average interval value.

As described above, the first embodiment overlooks small temporal-reference errors, but changes badly incorrect temporal-reference values to values that are at least approximately correct, thereby preventing large timing errors from appearing, and preventing such timing errors from propagating into subsequent frames.

In a variation of the first embodiment, the temporal-reference memory unit 105 stores past interval values, instead of past frame numbers. In another variation, the temporal-reference memory unit 105 stores the calculated average and the number of intervals included in the calculated average. In yet another variation, the temporal-reference memory unit 105 only stores the number of intervals, and the average is obtained by dividing this number into the current absolute frame number.

2nd Embodiment

The second embodiment adds means of dynamically adjusting the value of the parameter d.

Figure 6:
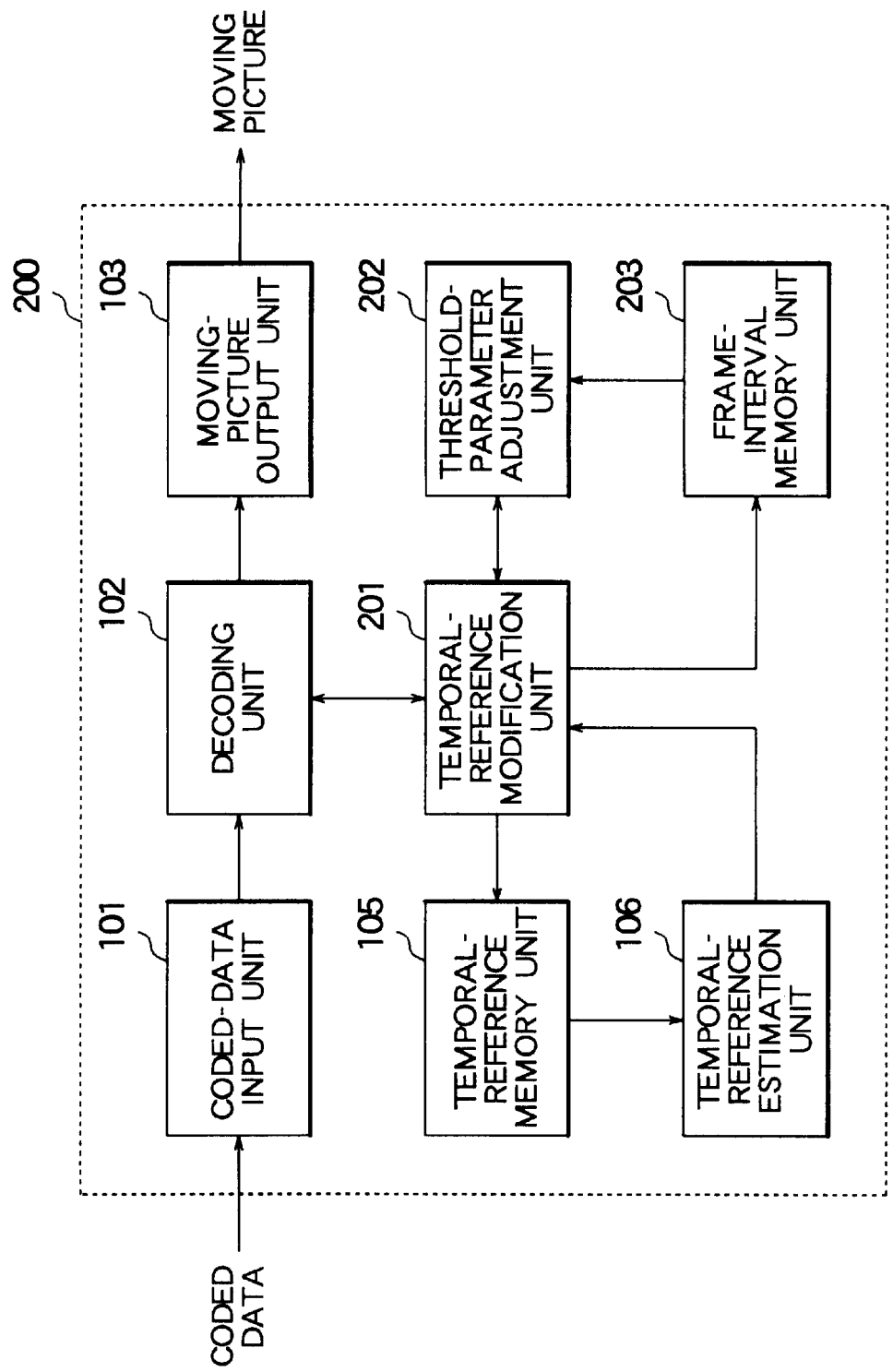
FIG. 6 is a block diagram of a picture decoding apparatus illustrating a second embodiment.

Referring to FIG. 6, the second embodiment is a moving-picture decoding apparatus 200 with a coded-data input unit 101, decoding unit 102, moving-picture output unit 103, temporal-reference memory unit 105, and temporal-reference estimation unit 106 as described in the first embodiment, an altered temporal-reference modification unit 201, and an additional threshold-parameter adjustment unit 202 and frame-interval memory unit 203.

The temporal-reference modification unit 201 has the same functions as the temporal-reference modification unit 104 in the first embodiment, but receives the threshold parameter d from the threshold-parameter adjustment unit 202. The temporal-reference value output by the temporal-reference modification unit 201 is supplied to the frame-interval memory unit 203 as well as to the decoding unit 102.

The threshold-parameter adjustment unit 202 reads the information stored in the frame-interval memory unit 203, and adjusts the threshold parameter d according to the variability of the intervals between past frames. The threshold-parameter adjustment unit 202 reduces d when the variability is small, and increases d when the variability becomes large.

The frame-interval memory unit 203 converts the temporal-reference values supplied by the temporal-reference modification unit 201 to interval values, and stores the interval values for the past several frames.

Next, the operation of the second embodiment will be described.

Figure 7:
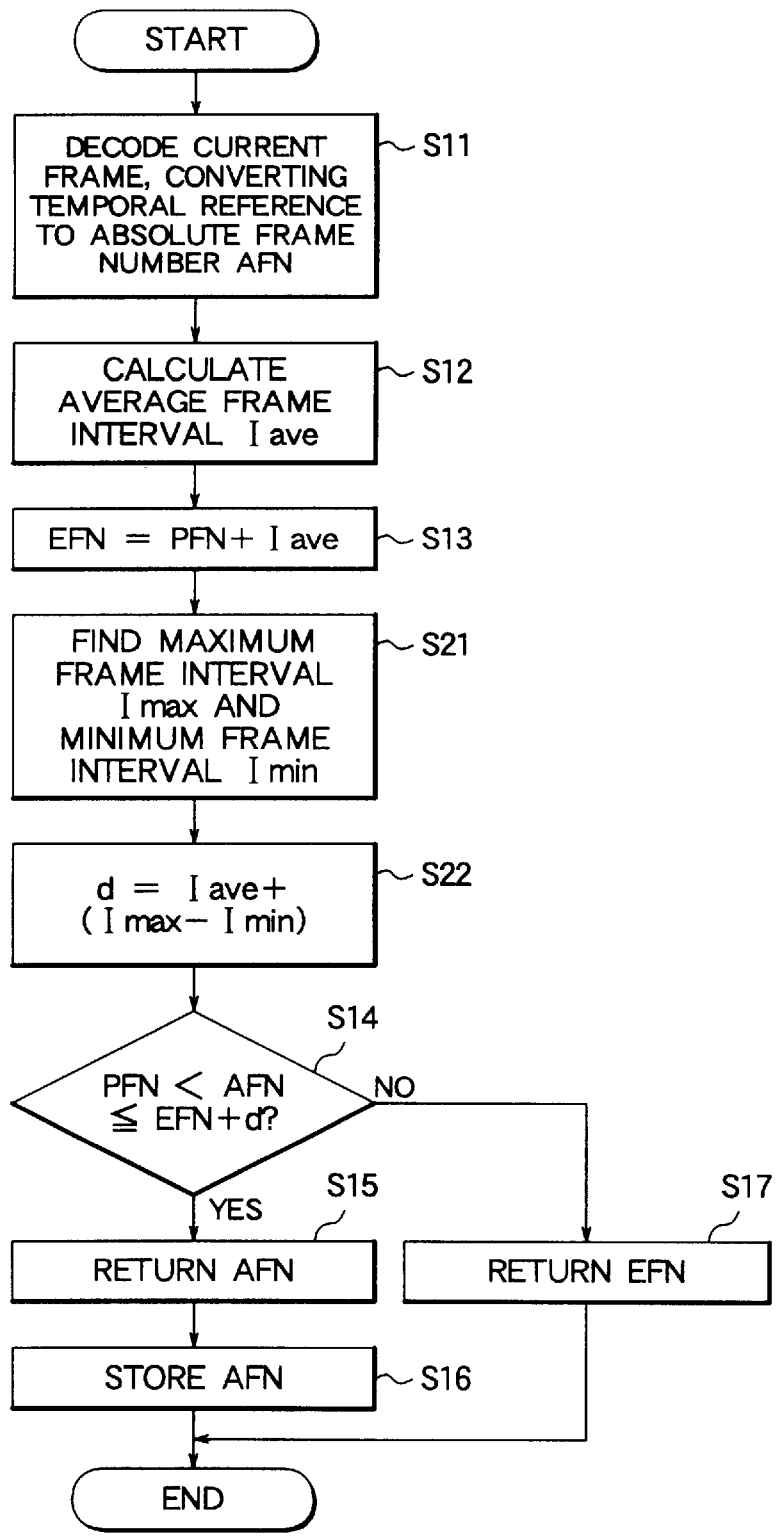
FIG. 7 is a flowchart illustrating the operation of the second embodiment.

Referring to FIG. 7, the received temporal-reference values are converted to absolute frame numbers (step S11), the average frame interval is calculated (step S12), and an estimated frame number EFN is obtained (step S13) as described in the first embodiment. The threshold-parameter adjustment unit 202 then finds the maximum interval Imax and minimum interval Imin stored in the frame-interval memory unit 203 (step S21), and sets the threshold parameter d equal to the sum of their difference (Imax–Imin) and the average value (Iave) calculated by the temporal-reference estimation unit 106 (step S22).

The remaining steps are the same as in the first embodiment. The temporal-reference modification unit 201 compares the supplied frame number (AFN) with the estimated frame number (EFN) plus d (step S14), returns AFN to the decoding unit 102 (step S15) and stores it in the temporal-reference memory unit 105 (step S16) if AFN does not exceed EFN+d, and returns the estimated value EFN to the decoding unit 102 otherwise (step S17). As in the first embodiment, when AFN is replaced by EFN, EFN may also be stored in the temporal-reference memory unit 105, provided it is flagged as an estimated value.

The second embodiment provides substantially the same effect as the first embodiment, preventing large temporal-reference errors from appearing in the displayed picture or propagating into subsequent frames.

When inter-frame coding is employed, the amount of coded data per frame tends to vary, depending on the amount of motion present in the picture. When a moving picture is transmitted at a constant bit rate, with a constant quantization step size, the motion-induced variations in the coded data size can be dealt with by varying the frame rate. Accordingly, the interval between transmitted frames may become longer or shorter as the amount of motion increases or decreases. When the frame interval is highly variable, the threshold parameter d must have a high value to avoid the unwanted modification of correct temporal-reference values. When the frame interval does not vary much, however, a low value of d is desirable, so that more errors can be detected and corrected.

By adjusting the value of the threshold parameter d dynamically, the second embodiment enables an appropriate value to be used in all situations.

In a variation of the second embodiment, step S22 is not carried out at every frame, but only when made necessary by a significant change in the behavior of the coded data. For example, the parameter d can normally be set equal to the average value calculated by the temporal-reference estimation unit 106, the difference (Imax–Imin) being added only when the frame interval is observed to fluctuate greatly.

3rd Embodiment

The third embodiment adjusts the parameter d dynamically according to the coding mode.

Figure 8:
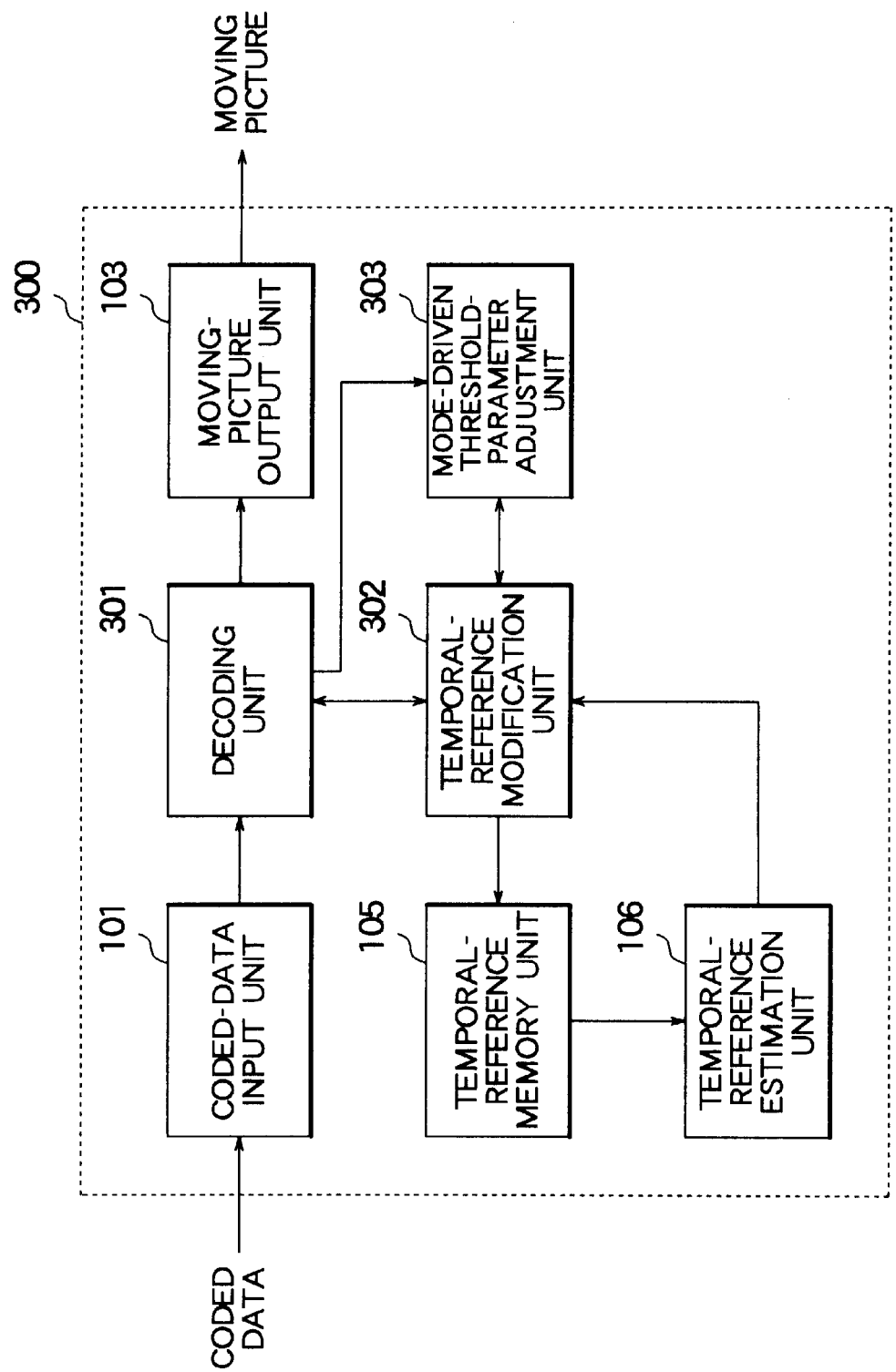
FIG. 8 is a block diagram of a picture decoding apparatus illustrating a third embodiment.

Referring to FIG. 8, the third embodiment is a moving-picture decoding apparatus 300 with a coded-data input unit 101, moving-picture output unit 103, temporal-reference memory unit 105, and temporal-reference estimation unit 106 as described in the first embodiment, an altered decoding unit 301 and temporal-reference modification unit 302, and an additional mode-driven threshold-parameter adjustment unit 303.

The decoding unit 301 performs the same decoding functions as the decoding unit 102 in the preceding embodiments, but also sends the mode-driven threshold-parameter adjustment unit 303 information indicating whether each frame was coded in the inter-frame or intra-frame mode.

The temporal-reference modification unit 302 has the same functions as the temporal-reference modification unit 104 in the first embodiment, but receives the parameter d from the mode-driven threshold-parameter adjustment unit 303.

The mode-driven threshold-parameter adjustment unit 303 stores the coding modes of the current frame and the preceding frame, and adjusts the value of d according to the coding mode of the preceding frame.

Next, the operation of the third embodiment will be described.

Figure 9:
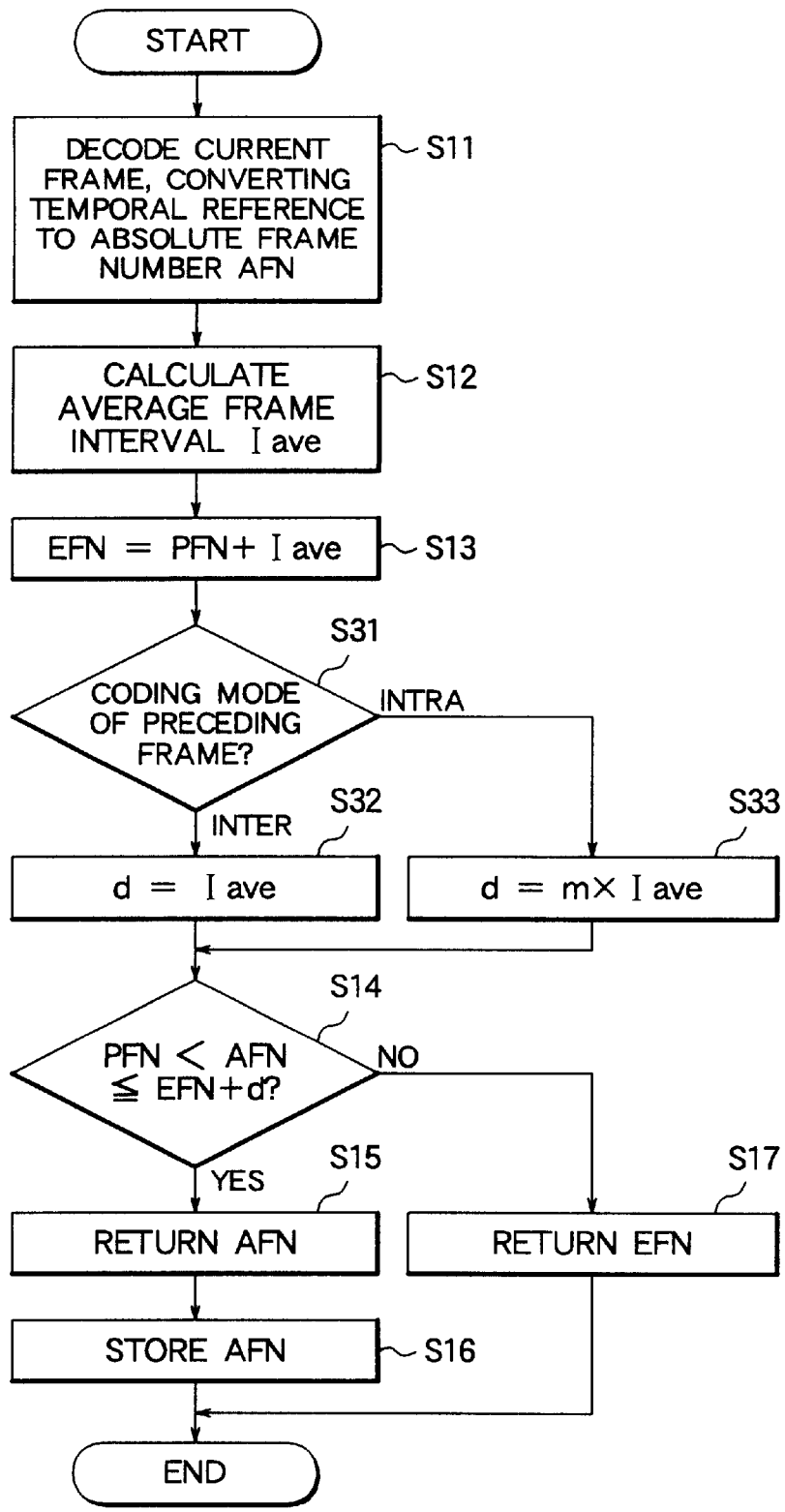
FIG. 9 is a flowchart illustrating the operation of the third embodiment.

Referring to FIG. 9, the received temporal-reference values are converted to absolute frame numbers (step S11), the average frame interval is calculated (step S12), and an estimated frame number EFN is obtained (step S13) as described in the first embodiment. The mode-driven threshold-parameter adjustment unit 303 then determines whether the coding mode of the preceding frame was inter-frame or intra-frame (step S31). If the mode was inter-frame, the mode-driven threshold-parameter adjustment unit 303 sets the parameter d equal to the average value calculated by the temporal-reference estimation unit 106 (step S32). If the mode was intra-frame, the mode-driven threshold-parameter adjustment unit 303 sets the parameter d equal to the average value calculated by the temporal-reference estimation unit 106, multiplied by a predetermined constant m (step S33), where m is an integer approximately equal to the ratio between the amounts of data produced by intra-frame and inter-frame decoding. The value of m is, for example, in the range from two to five.

The remaining steps are the same as in the first embodiment. The temporal-reference modification unit 201 compares the supplied frame number (AFN) with the estimated frame number (EFN) plus d (step S14), returns AFN to the decoding unit 102 (step S15) and stores it in the temporal-reference memory unit 105 (step S16) if AFN does not exceed EFN+d, and returns the estimated value EFN to the decoding unit 102 otherwise (step S17). As in the first embodiment, when AFN is replaced by EFN, EFN may also be stored in the temporal-reference memory unit 105, provided it is flagged as an estimated value.

The third embodiment provides substantially the same effect as the first embodiment, preventing large temporal-reference errors from appearing in the displayed picture or propagating into subsequent frames, but also makes allowance for the unexpected occurrence of intra-frame coding.

Intra-frame coding occurs unexpectedly in so-called refresh-on-demand systems, which use intra-frame coding to recover from transmission errors. Intra-frame coding usually generates several times as much coded data as inter-frame coding. Extra time may be needed to transmit the data, especially if the transmit buffer of the coding apparatus is unable to store all of the intra-frame coded data at once, leading to an unexpectedly long interval before the next frame can be transmitted.

The third embodiment immediately adjusts the parameter d so that the unexpectedly long interval is not mistakenly considered to be a temporal-reference error.

In a variation of the third embodiment, the threshold parameter d is adjusted according to the coding mode of the current frame instead of the preceding frame. In another variation, when intra-frame coding occurs, the value of the parameter d is adjusted for the next several frames, instead of just for one frame. These variations can be selected according to the details of the coding method employed.

In another variation, the third embodiment is combined with the second embodiment, the value of the parameter d being adjusted according to both the coding mode and the degree of recent variability of the frame interval.

4th Embodiment

The fourth embodiment is adapted for use in the redundant temporal-reference mode, in which each frame is divided into segments and the header of each segment includes a temporal reference.

Figure 10:
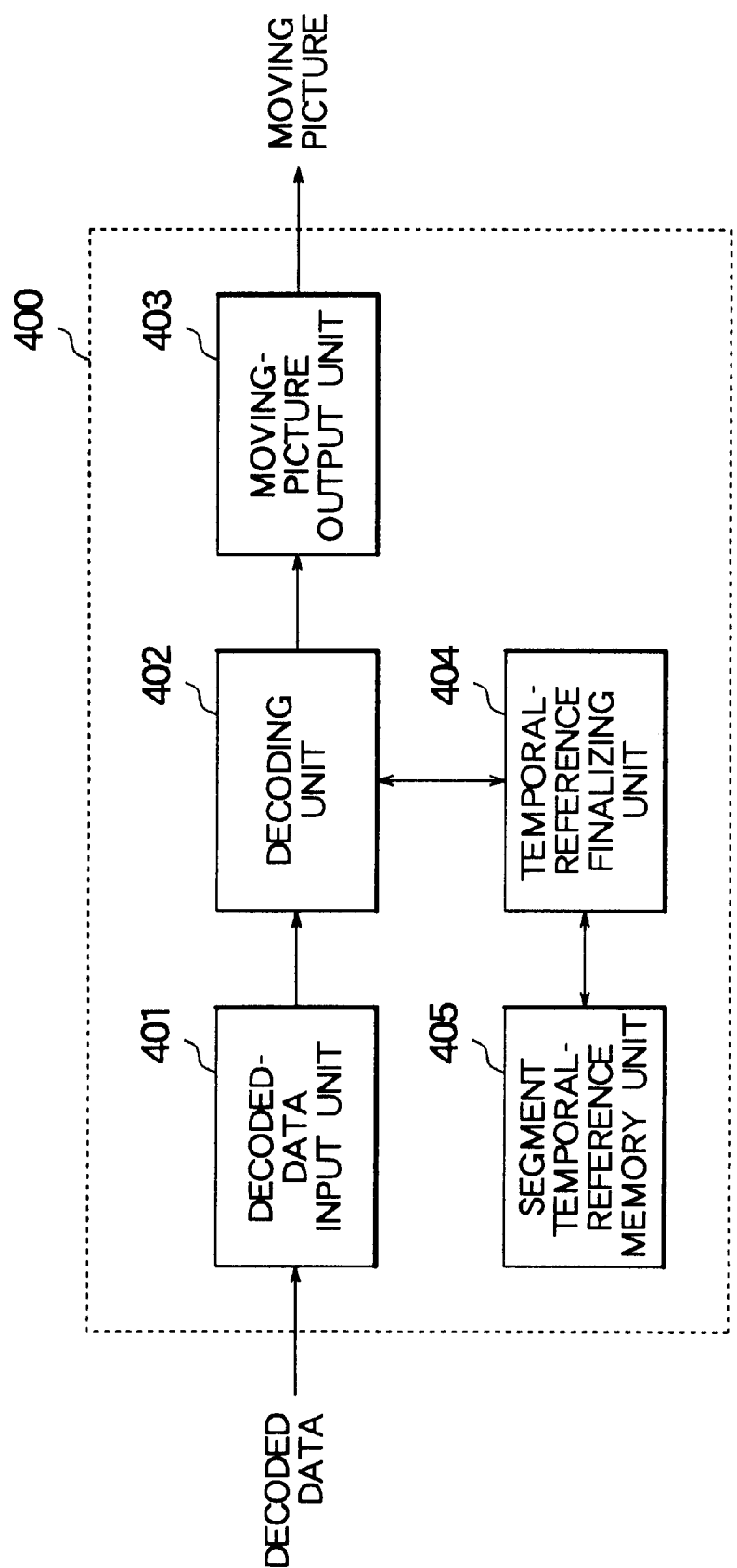
FIG. 10 is a block diagram of a picture decoding apparatus illustrating a fourth embodiment.

Referring to FIG. 10, the fourth embodiment is a moving-picture decoding apparatus 400 comprising a coded-data input unit 401, a decoding unit 402, a moving-picture output unit 403, a temporal-reference finalizing unit 404, and a segment temporal-reference memory unit 405.

As in the preceding embodiments, the coded-data input unit 401 receives coded moving-picture data from a network or communication channel, or reads the coded data from a storage device, but the data are received or read on a segment-by-segment basis, and are provided to the decoding unit 402 on a segment-by-segment basis.

The decoding unit 402, accordingly, decodes the received data one segment at a time. The decoding unit 402 supplies the decoded segment data to the moving-picture output unit 403, and supplies the temporal reference accompanying each segment to the temporal-reference finalizing unit 404. At the end of each frame, the decoding unit 402 receives a finalized temporal reference from the temporal-reference finalizing unit 404, and supplies the finalized temporal reference to the moving-picture output unit 403. The moving-picture output unit 403 combines the segments received from the decoding unit 402 into a frame for display on a monitor display device (not visible), at timings determined by the finalized temporal reference.

The temporal-reference finalizing unit 404 writes each temporal reference received from the decoding unit 402 into the segment temporal-reference memory unit 405, and uses the temporal references of all segments in a frame to determine the finalized temporal reference of the frame.

The segment temporal-reference memory unit 405 stores a set of temporal references including one temporal reference for each segment in the current frame.

Next, the operation of the fourth embodiment will be described.

Figure 11:
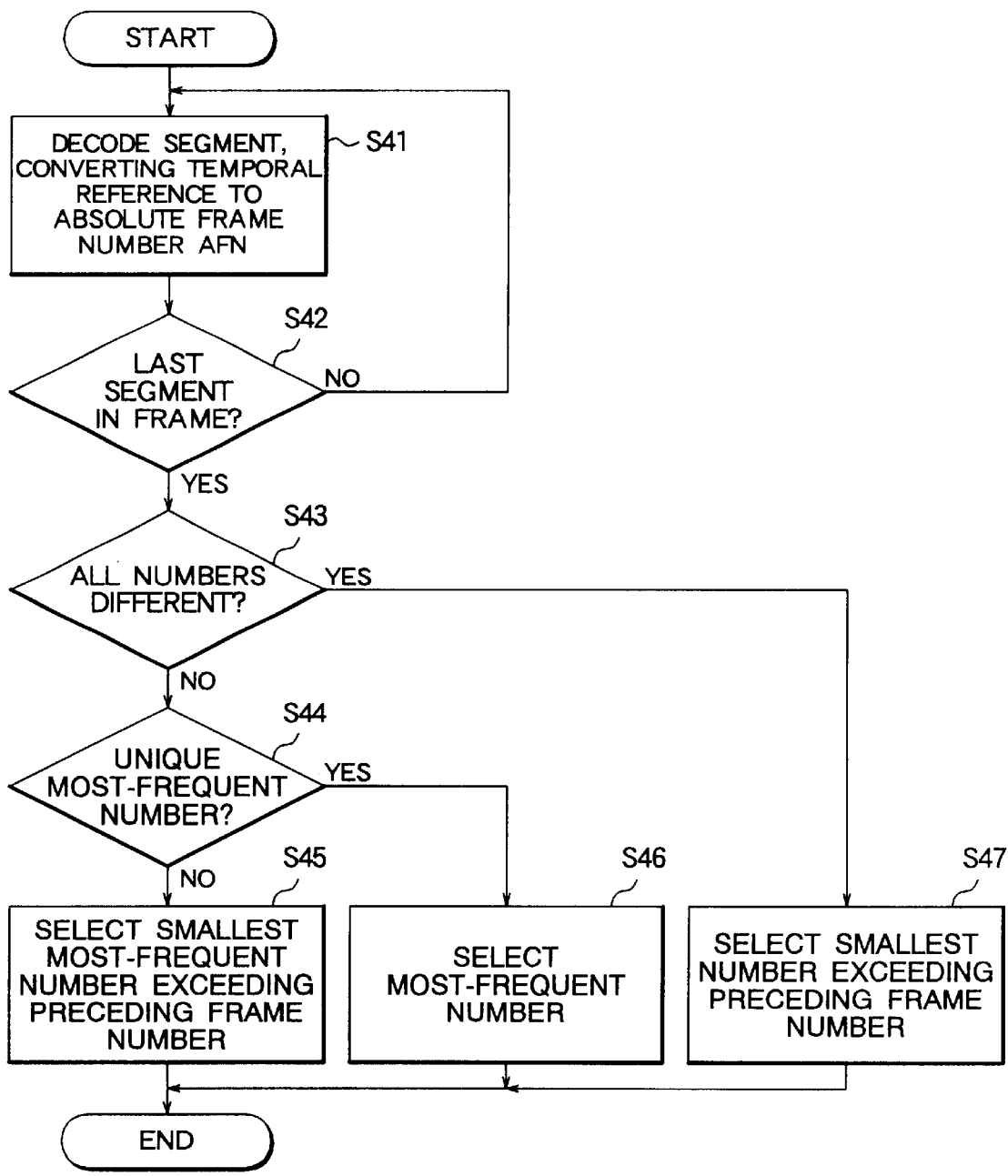
FIG. 11 is a flowchart illustrating the operation of the fourth embodiment.

Referring to FIG. 11, as the decoding unit 402 decodes each segment, it converts the temporal-reference value received with the segment to an absolute frame number (step S41) by adding high-order bits, substantially as described in the first embodiment. Absolute frame numbers are used in all subsequent processing.

After decoding each segment, the decoding unit 402 determines whether the decoded segment was the last segment in the current frame (step S42), and returns to step S41 if it was not the last segment in the frame.

When all segments in one frame have been decoded, the temporal-reference finalizing unit 404 checks their absolute frame numbers to determine whether the frame numbers received in the frame are all different, or whether any one frame number occurs at least twice (step S43). If at least one frame number occurs at least twice, the temporal-reference finalizing unit 404 determines whether the most frequent frame number is unique (step S44); that is, whether, among the frame numbers of the segments in the frame, one frame number occurs more often than any other frame number, or whether there are two or more different most-frequent frame numbers. In the latter case, the temporal-reference finalizing unit 404 selects the smallest of the most-frequent frame numbers that is larger than the frame number of the preceding frame (step S45). If there is a unique most-frequent frame number, the temporal-reference finalizing unit 404 selects it (step S45). If the frame numbers occurring in the frame are all different, the temporal-reference finalizing unit 404 selects the smallest of them that is larger than the frame number of the preceding frame (step S47).

In the case illustrated in FIG. 3, the frame numbers (10, 138, 10) are not all different, giving a 'no' result in step S43, and there is a unique most-frequent number (10), giving a 'yes' result in step S44, so step S46 is carried out, and the most-frequent frame number (10), which is the correct frame number, is assigned to the frame as a whole.

In the case illustrated in FIG. 2, the most-frequent number (15) is assigned to all three received segments, causing the two frames to collapse into one frame, as shown in FIG. 1 (although with TR=15 instead of TR=10).

The fourth embodiment accordingly prevents the type of frame break-up shown in FIG. 3, but allows multiple frames to collapse as in FIG. 1. As noted above, the error in FIG. 3 is more common and more serious than the error in FIG. 1. Compared with the prior art, which prevents the error in FIG. 1 but allows the type of error shown in FIG. 3, the fourth embodiment yields an improvement in overall picture reliability and quality.

5th Embodiment

The fifth embodiment combines the features of the first and fourth embodiments.

Figure 12:
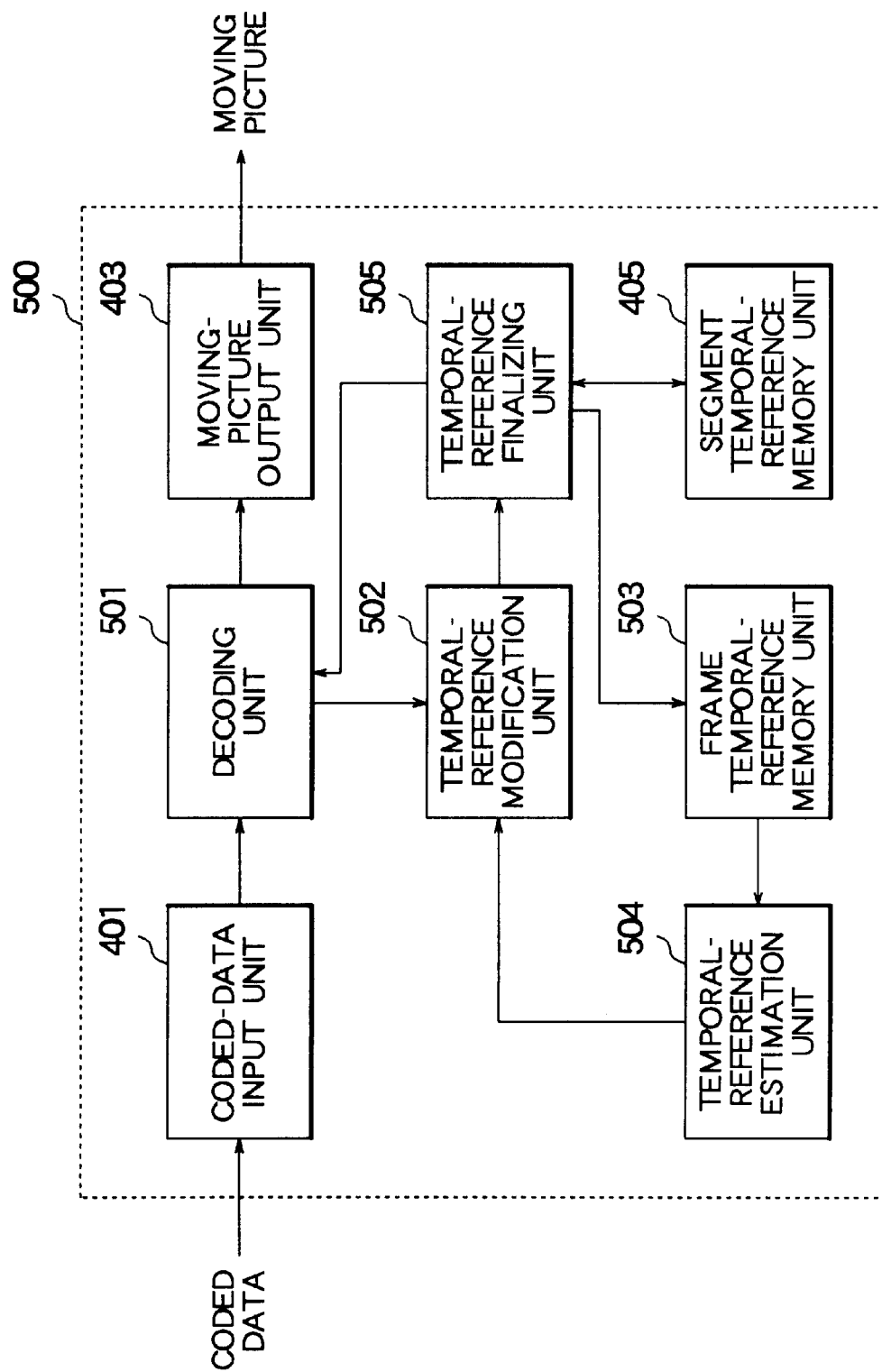
FIG. 12 is a block diagram of a picture decoding apparatus illustrating a fifth embodiment.

Referring to FIG. 12, the fifth embodiment is a moving-picture decoding apparatus 500 comprising the coded-data input unit 401, moving-picture output unit 403, and segment temporal-reference memory unit 405 of the fourth embodiment. The fifth embodiment also has a decoding unit 501, temporal-reference modification unit 502, frame temporal-reference memory unit 503, temporal-reference estimation unit 504, and temporal-reference finalizing unit 505, which are modifications of the corresponding elements in the first and fourth embodiments.

The decoding unit 501 decodes the segments received by the coded-data input unit 401 supplies the decoded picture data to the moving-picture output unit 403, converts the temporal reference accompanying each segment to an absolute frame number AFN, supplies this absolute frame number to the temporal-reference modification unit 502, receives a finalized frame number FFN from the temporal-reference finalizing unit 505, and supplies the finalized frame number to the moving-picture output unit 403 together with the last segment of each frame.

For each frame, the temporal-reference modification unit 502 compares the absolute frame numbers received from the decoding unit 501 with an estimated value EFN received from the temporal-reference estimation unit 504, and modifies the absolute frame numbers as necessary, so that each remains larger than the frame number PFN of the preceding frame, but does not exceed the sum of the estimated value EFN and a threshold parameter d. The resulting temporal-reference values are supplied to the temporal-reference finalizing unit 505. When a frame number is modified because it exceeds the estimated value plus d, it is replaced by the estimated value, and the temporal-reference finalizing unit 505 is notified that the supplied value is an estimated value.

The frame temporal-reference memory unit 503 receives finalized frame numbers from the temporal-reference finalizing unit 505, and stores these numbers for the past several frames.

The temporal-reference estimation unit 504 uses the information stored in the frame temporal-reference memory unit 503 to calculate the average interval between frames over the past several frames, and adds this frame interval to the frame number PFN of the immediately preceding frame to obtain the estimated value supplied to the temporal-reference modification unit 502.

The temporal-reference finalizing unit 505 stores the frame numbers received from the temporal-reference modification unit 502 in the segment temporal-reference memory unit 405. At the end of each frame, the temporal-reference finalizing unit 505 reads the values stored in the segment temporal-reference memory unit 405, and determines the finalized frame number of the frame.

Next, the operation of the fifth embodiment will be described.

Figure 13A:
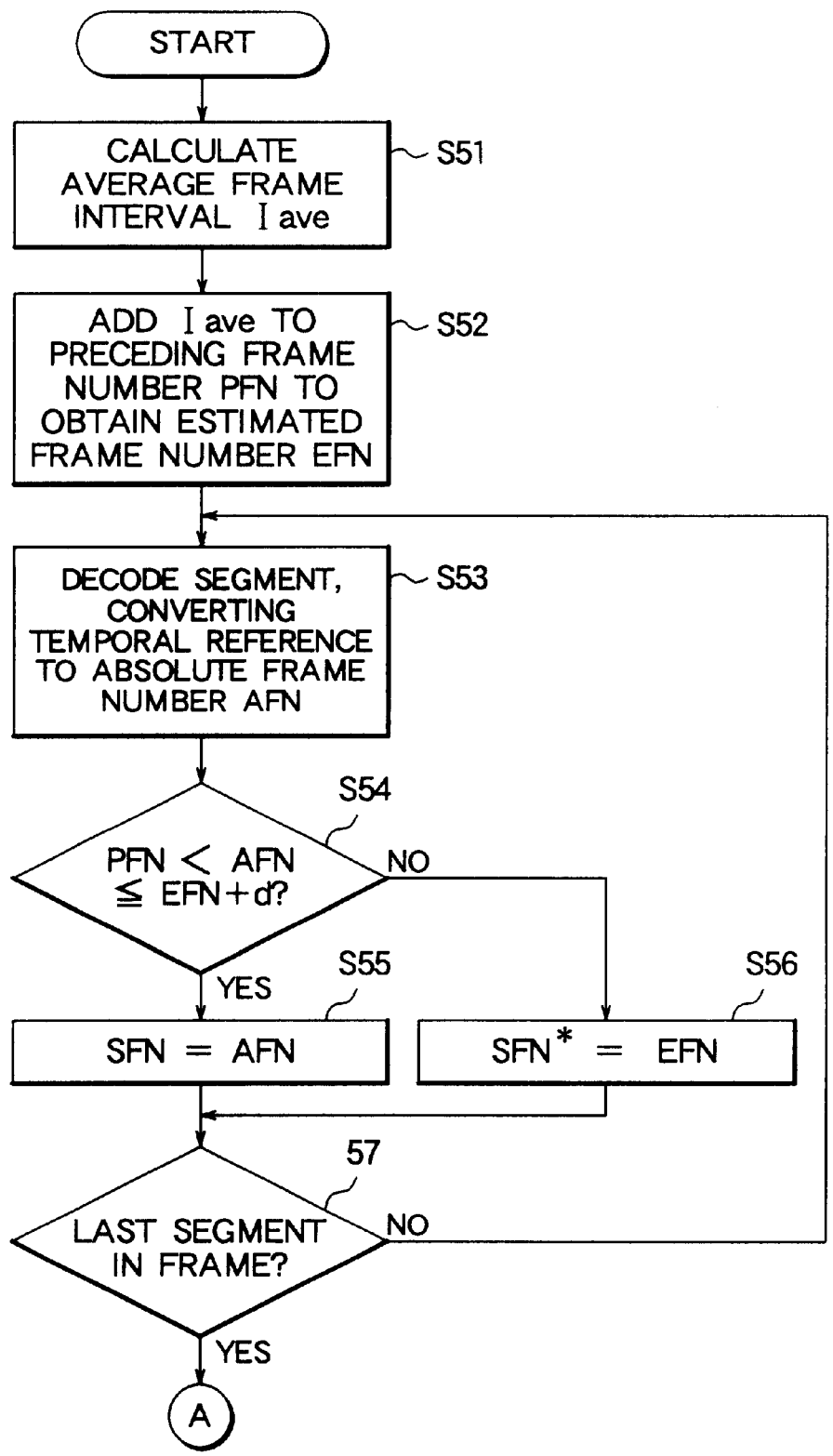

Referring to FIG. 13A, after the preceding frame has been decoded and its finalized frame number has been stored in the frame temporal-reference memory unit 503, the temporal-reference estimation unit 504 calculates the average interval (Iave) between frame numbers stored in the frame temporal-reference memory unit 503 (step S51), rounds the average value up or down to an integer, and adds this integer to the immediately preceding finalized frame number PFN to obtain an estimated frame number EFN (step S52).

As each segment of the current frame is decoded, the decoding unit 501 compares its temporal reference with the preceding frame number (PFN) and adds high-order bits to convert the temporal-reference value to an absolute frame number AFN (step S53). The high-order bits are given the smallest value that makes AFN exceed the preceding frame number PFN.

Next, the temporal-reference modification unit 502 compares the absolute frame number AFN of the segment with the sum of the estimated frame number EFN and the parameter d (step S54). If AFN does not exceed this sum (EFN+d) then since AFN is already known to exceed the preceding frame number PFN, it is provisionally accepted as a valid number, referred to below as a segment frame number SFN, and is supplied to the temporal-reference finalizing unit 505 and stored in the segment temporal-reference memory unit 405 (step S55). If AFN exceeds the sum (EFN+d), it is replaced with the estimated frame number EFN, and the resulting modified segment frame number SFN is supplied to the temporal-reference finalizing unit 505 together with a flag (*) indicating that the value is estimated (step S56). Both the supplied value and this flag indication are stored in the segment temporal-reference memory unit 405.

After step S55 or S56, a decision is made as to whether the current segment is the last segment in the current frame (step S57). If it is not, the process returns to step S53 to deal with the next segment in the frame.

Referring to FIG. 13B, when all segments in the frame have been decoded, the temporal-reference finalizing unit 505 reads the unmodified SFN values stored in the segment temporal-reference memory unit 405, these being the values that are not flagged as estimated values, and determines whether any one of these unmodified values occurs at least twice (step S58). If so, the temporal-reference finalizing unit 505 determines whether there is a unique most-frequent unmodified value (step S59). If there is no unique most-frequent unmodified SFN value, the temporal-reference finalizing unit 505 selects the smallest most-frequent unmodified SFN value that exceeds the preceding frame number (step S60). If there is a unique most-frequent SFN value, the temporal-reference finalizing unit 505 selects it (step S61). The value selected in step S60 or step S61 is stored in the frame temporal-reference memory unit 503 and supplied to the decoding unit 501 as the finalized frame number FFN (step S62).

If no unmodified SFN value occurs twice in step S58, this may be because the unmodified SFN values are all different, or because there are no unmodified SFN values; that is, because all of the values stored in the segment temporal-reference memory unit 405d are the flagged SFN value. The temporal-reference finalizing unit 505 determines which of these two possibilities is the case (step S63). If all values are flagged, the temporal-reference finalizing unit 505 returns the flagged value SFN, which is equal to the estimated value EFN, to the decoding unit 501, but does not store this value in the frame temporal-reference memory unit 503 (step S64). If there is at least one unmodified SFN value, the temporal-reference finalizing unit 505 selects the unmodified SFN value that is closest to the estimated value EFN, if this SFN value is unique. If there are two closest unmodified SFN values, one greater than and one less than the estimated value EFN, the temporal-reference finalizing unit 505 selects the estimated value EFN. The selected value is returned to the decoding unit 501 as the finalized frame number FFN, but is not stored in the frame temporal-reference memory unit 503 (step S65).

By combining the features of the first and fourth embodiments, the fifth embodiment assigns a single, highly reliable frame number to all segments in the same frame.

In a variation of the fifth embodiment, the features of the second and fourth embodiment are combined by adding means of dynamically adjusting the parameter d, according to the variability of the frame interval.

In another variation of the fifth embodiment, the features of the third and fourth embodiments are combined, the parameter d being varied according to the coding mode.

Variations are also possible in the rules by which the temporal-reference finalizing unit 505 selects the final frame number. For example, in step S60 in FIG. 13B, the temporal-reference finalizing unit 505 can select the most-frequent unmodified value that is closest to the estimated value.

In any of the preceding embodiments, the step of converting the temporal-reference values to absolute frame numbers can be omitted, and all calculations can be carried out by unsigned arithmetic on the received number of temporal-reference bits, without adding high-order bits. For example, step S14 in FIG. 5 can be carried out be comparing AFN–PFN with EFN+d–PFN, where AFN, PFN, EFN, and d are all eight-bit values. In step S12 in FIG. 5, the average interval (Iave) can be calculated from the sum of the individual intervals, preferably ignoring intervals that are unusually large.

The embodiments described above, and the variations thereof, may be implemented in either hardware or software.

Those skilled in the art will recognize that further variations are possible within the scope claimed below.

What is claimed is:

1. A picture decoding apparatus decoding a series of coded frames, each coded frame including a temporal reference, comprising:
   a temporal-reference memory unit storing a plurality of past temporal references received in said coded frames;
   a temporal-reference estimation unit coupled to said temporal-reference memory unit, calculating an estimated temporal reference from said past temporal references; and
   a temporal-reference modification unit coupled to said temporal-reference memory unit, comparing said estimated temporal reference with a current temporal reference received in one of said coded frames, and modifying said current temporal reference in said one of said coded frames according to a difference between said current temporal reference and said estimated temporal reference.

2. The picture decoding apparatus of claim 1, wherein said temporal-reference estimation unit calculates an average interval between said past temporal references, and adds said average interval to a preceding temporal reference, received in a preceding one of said coded frames, to obtain said estimated temporal reference.

3. The picture decoding apparatus of claim 1, wherein said temporal-reference modification unit compares said estimated temporal reference with said current temporal reference by determining whether said current temporal reference exceeds a sum of said estimated temporal reference and a threshold parameter.

4. The picture decoding apparatus of claim 3, wherein said temporal-reference modification unit leaves said current temporal reference unmodified if said current temporal reference does not exceed said sum.

5. The picture decoding apparatus of claim 3, wherein said temporal-reference modification unit leaves said current temporal reference unmodified if said current temporal reference exceeds a preceding temporal reference, received in a preceding one of said coded frames, and does not exceed said sum.

6. The picture decoding apparatus of claim 3, wherein said temporal-reference modification unit replaces said current temporal reference with said estimated temporal reference, if said current temporal reference exceeds said sum.

7. The picture decoding apparatus of claim 3, further comprising a threshold-parameter adjustment unit adjusting said threshold parameter according to a degree of variability of intervals between said past temporal references.

8. The picture decoding apparatus of claim 3, further comprising a threshold-parameter adjustment unit adjusting said threshold parameter according to a coding mode of said coded frames.

9. The picture decoding apparatus of claim 8, wherein said threshold-parameter adjustment unit adjusts said threshold parameter according to the coding mode of a current one of said coded frames.

10. The picture decoding apparatus of claim 8, wherein said threshold-parameter adjustment unit adjusts said threshold parameter according to the coding mode of a preceding one of said coded frames.

11. The picture decoding apparatus of claim 8, wherein said threshold-parameter adjustment unit increases said threshold parameter in response to intra-frame coding.

12. The picture decoding apparatus of claim 1, wherein each coded frame in said series of coded frames is divided into a plurality of coded segments, each of said coded segments separately including a temporal reference, further comprising:
   a temporal-reference finalizing unit selecting a final temporal-reference for each one of said coded frames, and supplying said final temporal reference to said temporal-reference memory unit for storage as one of said past temporal references.

13. The picture decoding apparatus of claim 12, wherein said temporal-reference modification unit compares said estimated temporal reference with the temporal reference received in each one of said coded segments, thereby decides whether it is necessary to modify each said temporal reference, modifies each said temporal reference if necessary, and provides said temporal-reference finalizing unit with a resulting set of temporal references for each said coded frame.

14. The picture decoding apparatus of claim 13, wherein said temporal-reference finalizing unit selects a most-frequent unmodified temporal reference from said set of temporal references.

15. The picture decoding apparatus of claim 13, wherein said temporal-reference finalizing unit selects a smallest most-frequent unmodified temporal reference, if said set of temporal references includes two different most-frequent unmodified temporal references.

16. The picture decoding apparatus of claim 13, wherein said temporal-reference finalizing unit selects a most-frequent unmodified temporal reference closest to said estimated temporal reference.

17. The picture decoding apparatus of claim 13, wherein said temporal-reference finalizing unit selects said estimated temporal reference, if all temporal references in said set of temporal references have been modified by said temporal-reference modification unit.

18. A method of decoding a series of coded frames of a moving picture, each coded frame including a temporal reference, comprising the steps of:
   (a) storing a plurality of past temporal references received in said coded frames;
   (b) calculating an estimated temporal reference from said past temporal references;
   (c) comparing said estimated temporal reference with a current temporal reference received in one of said coded frames; and
   (d) modifying said current temporal reference in said one of said coded frames according to a difference between said current temporal reference and said estimated temporal reference.

19. The method of claim 18, wherein said step (b) further comprises the steps of:
   calculating an average interval between said past temporal references; and
   adding said average interval to a preceding temporal reference, received in a preceding one of said coded frames, to obtain said estimated temporal reference.

20. The method of claim 18, wherein said step (c) is carried out by determining whether said current temporal reference exceeds a sum of said estimated temporal reference and a threshold parameter.

21. The method of claim 20, wherein said step (d) leaves said current temporal reference unmodified if said current temporal reference does not exceed said sum.

22. The method of claim 20, wherein said step (d) leaves said current temporal reference unmodified if said current temporal reference exceeds a preceding temporal reference, received in a preceding one of said coded frames, and does not exceed said sum.

23. The method of claim 20, wherein said step (d) replaces said current temporal reference with said estimated temporal reference, if said current temporal reference exceeds said sum.

24. The method of claim 20, further comprising the step of:

(e) adjusting said threshold parameter according to a degree of variability of intervals between said past temporal references.

25. The method of claim 20, further comprising the step of:

(f) adjusting said threshold parameter according to a coding mode of said coded frames.

26. The method of claim 25, wherein said step (f) adjusts said threshold parameter according to the coding mode of a current one of said coded frames.

27. The method of claim 25, wherein said step (f) adjusts said parameter according to the coding mode of a preceding one of said coded frames.

28. The method of claim 25, wherein said step (f) increases said threshold parameter in response to intra-frame coding.

29. The method of claim 18, wherein each coded frame in said series of coded frames is divided into a plurality of coded segments, each of said coded segments separately including a temporal reference, further comprising the step of:

(g) selecting a final temporal reference for each one of said coded frames, said final temporal reference being stored in said step (a).

30. The method of claim 29, wherein said step (c) further comprises the steps of:

comparing said estimated temporal reference with the temporal reference received in each one of said coded segments;

deciding whether it is necessary to modify the temporal reference received in each one of said coded segments;

modifying each said temporal reference if necessary; and temporarily storing a resulting set of temporal references for each said coded frame.

31. The method of claim 30, wherein said step (g) selects a most-frequent unmodified temporal reference from said set of temporal references.

32. The method of claim 30, wherein said step (g) selects a smallest most-frequent unmodified temporal reference, if said set of temporal references includes two different most-frequent unmodified temporal references.

33. The method of claim 30, wherein said step (g) selects a most-frequent unmodified temporal reference closest to said estimated temporal reference.

34. The method of claim 30, wherein said step (g) selects said estimated temporal reference, if all temporal references in said set of temporal references have been modified.

35. A picture decoding apparatus decoding a series of coded frames, each coded frame including a plurality of coded segments, each coded segment including a temporal reference, comprising:

a temporal-reference memory unit storing a plurality of temporal references received in the coded segments included in one of said coded frames; and a temporal-reference finalizing unit comparing the temporal references stored in said temporal-reference memory unit and selecting a final temporal reference for modifying said plurality of temporal references in said one of said coded frames.

36. The picture decoding apparatus of claim 35, wherein said temporal-reference finalizing unit selects a temporal reference exceeding a final temporal reference selected for a preceding one of said coded frames.

37. The picture decoding apparatus of claim 35, wherein said temporal-reference finalizing unit selects a most-frequent temporal reference stored in said temporal-reference memory unit.

38. The picture decoding apparatus of claim 35, wherein said temporal-reference finalizing unit selects a smallest most-frequent temporal reference, if the temporal references stored in said temporal-reference memory unit include two different most-frequent temporal references.

39. The picture decoding apparatus of claim 35, wherein said temporal-reference finalizing unit selects a smallest, most-frequent temporal reference exceeding a final temporal reference selected for a preceding one of said coded frames.

40. A method of decoding a series of coded frames of a moving picture, each coded frame including a plurality of coded segments, each coded segment including a temporal reference, comprising the steps of:

(a) storing a plurality of temporal references received in the coded segments included in one of said coded frames;

(b) comparing the stored temporal references; and (c) selecting a final temporal reference for modifying said plurality of temporal references in said one of said coded frames.

41. The method of claim 40, wherein said step (c) selects a temporal reference exceeding a final temporal reference selected for a preceding one of said coded frames.

42. The method of claim 40, wherein said step (c) selects a most-frequent stored temporal reference.

43. The method of claim 40, wherein said step (c) selects a smallest most-frequent stored temporal reference, if the stored temporal references include two different most-frequent temporal references.

44. The method of claim 40, wherein said step (c) selects a smallest, most-frequent stored temporal reference exceeding a final temporal reference selected for a preceding one of said coded frames.

* * * * *